(12) United States Patent
Custer

(10) Patent No.: US 11,648,989 B2
(45) Date of Patent: May 16, 2023

(54) HEAVY-DUTY VEHICLE FRAME RAIL CLAMP ON MOUNTING BRACKET, AND METHOD OF INSTALLING THE SAME

(71) Applicant: Bendix Commercial Vehicle Systems LLC, Elyria, OH (US)

(72) Inventor: Robert J. Custer, Elyria, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 204 days.

(21) Appl. No.: 17/180,104

(22) Filed: Feb. 19, 2021

(65) Prior Publication Data

US 2022/0266924 A1    Aug. 25, 2022

(51) Int. Cl.
  *B62D 27/06* (2006.01)
  *B62D 21/09* (2006.01)

(52) U.S. Cl.
  CPC ........... *B62D 27/065* (2013.01); *B62D 21/09* (2013.01); *B60Y 2200/142* (2013.01)

(58) Field of Classification Search
  CPC . B62D 27/065; B62D 21/09; B60Y 2200/142
  See application file for complete search history.

(56) References Cited

U.S. PATENT DOCUMENTS

| | | | | |
|---|---|---|---|---|
| 2,327,585 A | * | 8/1943 | Ulrich | B62D 27/065 296/30 |
| 5,560,576 A | * | 10/1996 | Cargill | B60P 7/15 224/403 |
| 5,711,397 A | | 1/1998 | Flora et al. | |
| 5,823,287 A | * | 10/1998 | Chidamparam | B62D 21/02 180/312 |
| 6,256,844 B1 | * | 7/2001 | Wheatley | B61D 45/001 410/110 |
| 7,201,398 B1 | * | 4/2007 | Christofaro | B62D 21/12 180/312 |
| 7,677,514 B1 | | 3/2010 | Palmer | |
| 7,980,594 B2 | | 7/2011 | Hendriks et al. | |
| 8,002,064 B2 | | 8/2011 | Yamada et al. | |
| 8,246,104 B2 | * | 8/2012 | Ohkubo | B62D 25/2036 296/193.07 |
| 8,484,930 B2 | * | 7/2013 | Ruehl | B62D 21/09 52/843 |

(Continued)

FOREIGN PATENT DOCUMENTS

| | | |
|---|---|---|
| CN | 202731514 U | 2/2013 |
| CN | 203766887 U | 8/2014 |

(Continued)

OTHER PUBLICATIONS

Chassis Grabber™ Mounting System, Heavy Duty Innovations, LLC, Apr. 9, 2019 (one (1) page).

*Primary Examiner* — Toan C To
(74) *Attorney, Agent, or Firm* — Crowell & Moring LLP

(57) ABSTRACT

A heavy-duty vehicle frame rail clamp on mounting bracket includes a first member, a second member, a third member, and at least one fastener. The third member is configured to contact the first member and the second member. The at least one fastener is applied to the third member. Upon a fastening thereof, the at least one fastener is configured to generate a clamping force on the first member and on the second member. The first member and the second member have a same shape.

18 Claims, 8 Drawing Sheets

(56) References Cited

U.S. PATENT DOCUMENTS

| | | | |
|---|---|---|---|
| 9,434,423 B2* | 9/2016 | Pertlik | B62D 21/02 |
| 9,587,433 B2 | 3/2017 | Sylvester et al. | |
| 9,821,656 B2 | 11/2017 | Hinde | |
| 10,532,778 B2* | 1/2020 | DeMonte | B62D 21/20 |
| 2007/0176406 A1* | 8/2007 | Ruehl | B62D 21/00 |
| | | | 280/785 |
| 2011/0233353 A1 | 9/2011 | Palmer | |
| 2014/0049033 A1* | 2/2014 | Yee | B62D 27/065 |
| | | | 280/797 |
| 2015/0233402 A1* | 8/2015 | Hudson | B62D 65/02 |
| | | | 24/456 |
| 2021/0188069 A1* | 6/2021 | Friedman | H01M 50/20 |
| 2022/0194481 A1* | 6/2022 | Spehar | B62D 65/02 |

FOREIGN PATENT DOCUMENTS

| | | |
|---|---|---|
| CN | 104742971 A | 7/2015 |
| CN | 206456441 U | 9/2017 |
| CN | 109572823 A | 4/2019 |
| EP | 1 508 489 B1 | 7/2013 |
| EP | 2 800 669 B1 | 4/2016 |
| GB | 617651 | 2/1949 |
| JP | 2001-30948 A | 2/2001 |
| JP | 2007-320421 A | 12/2007 |
| JP | 2013-244821 A | 12/2013 |
| JP | 2019-93931 A | 6/2019 |
| JP | 6769144 B2 | 10/2020 |
| KR | 10-2008-0111250 A | 12/2008 |
| RU | 2 028 240 C1 | 2/1995 |

\* cited by examiner

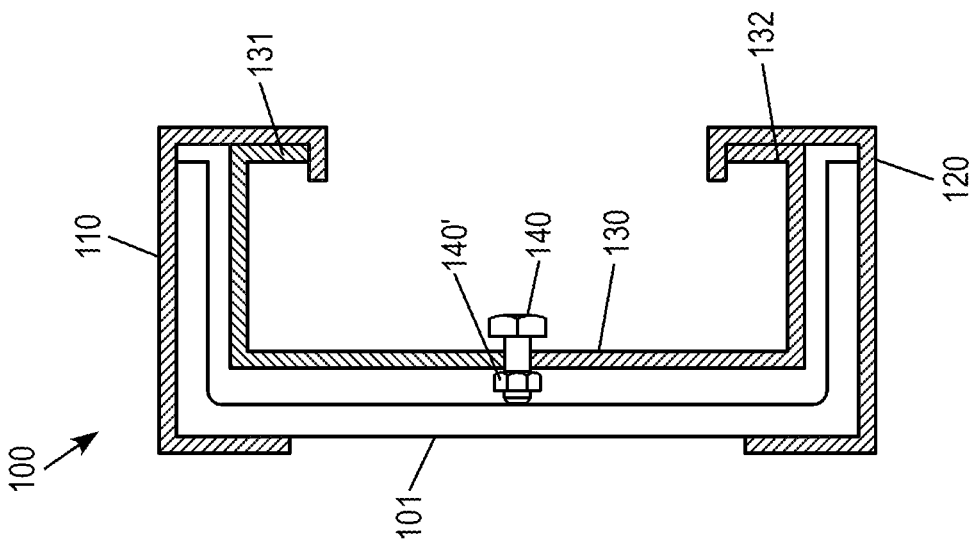
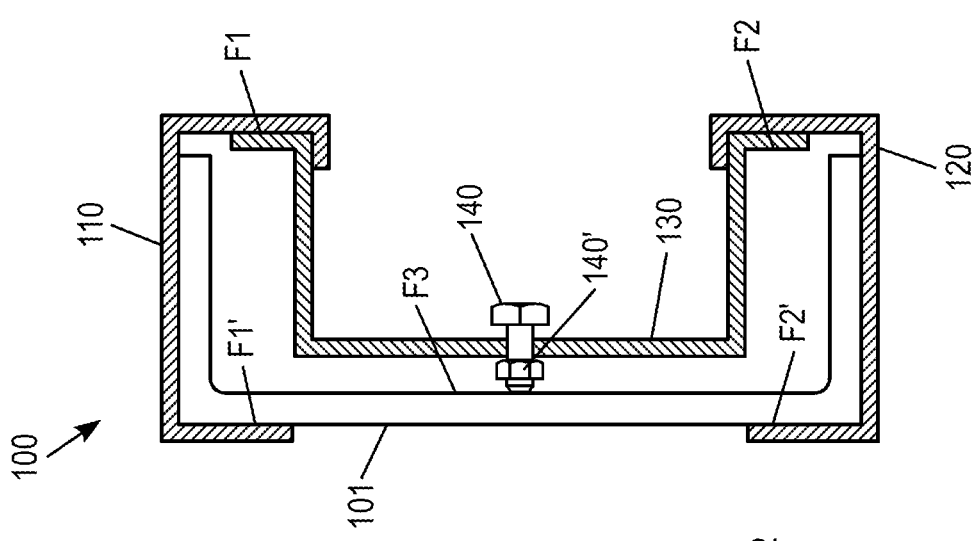
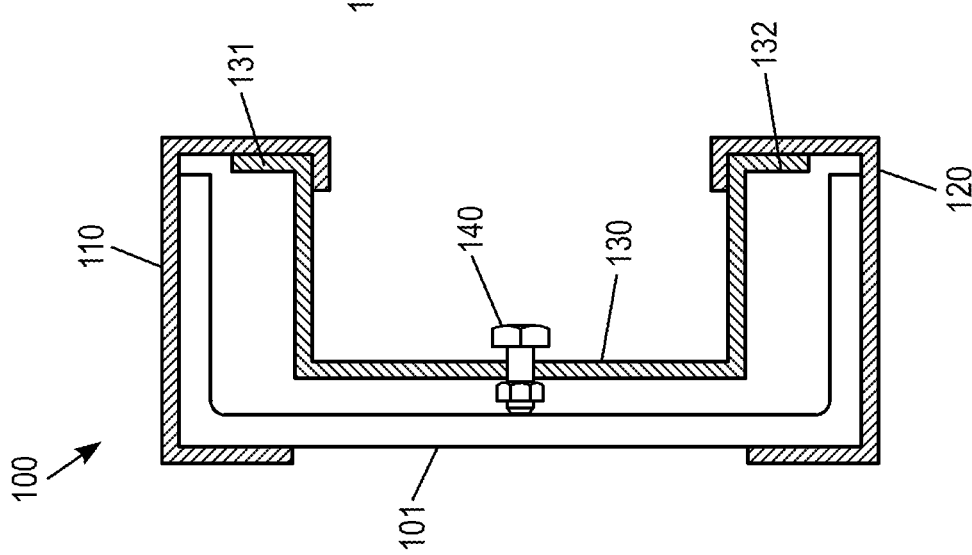

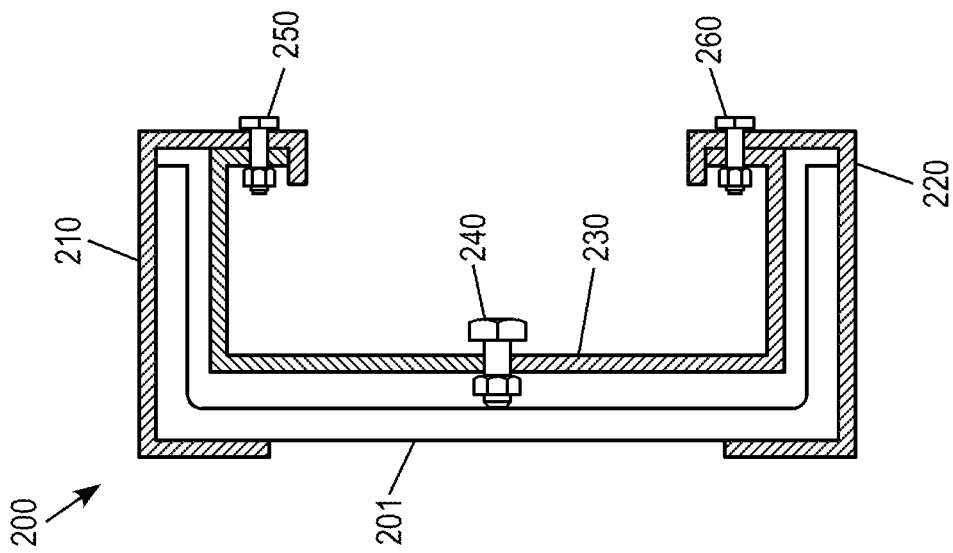
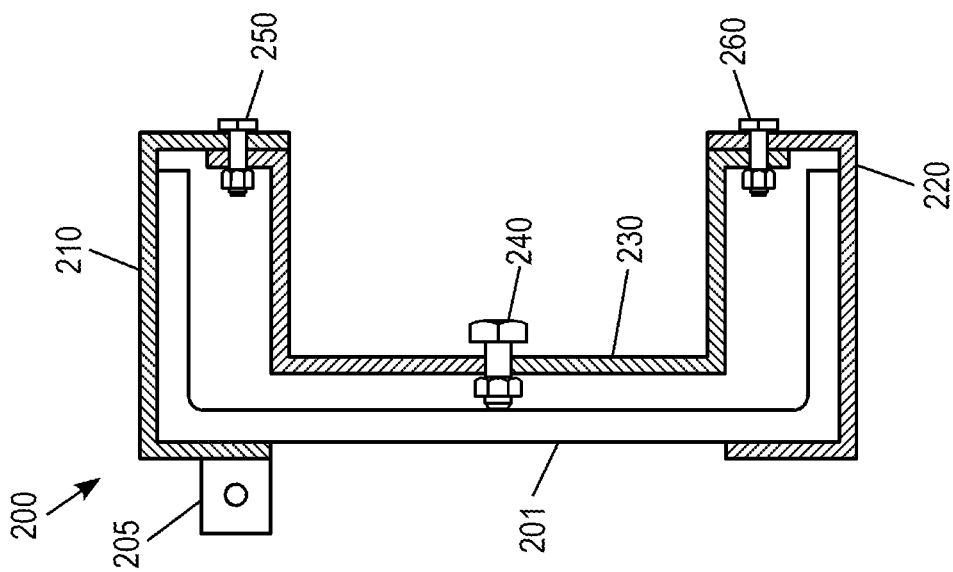

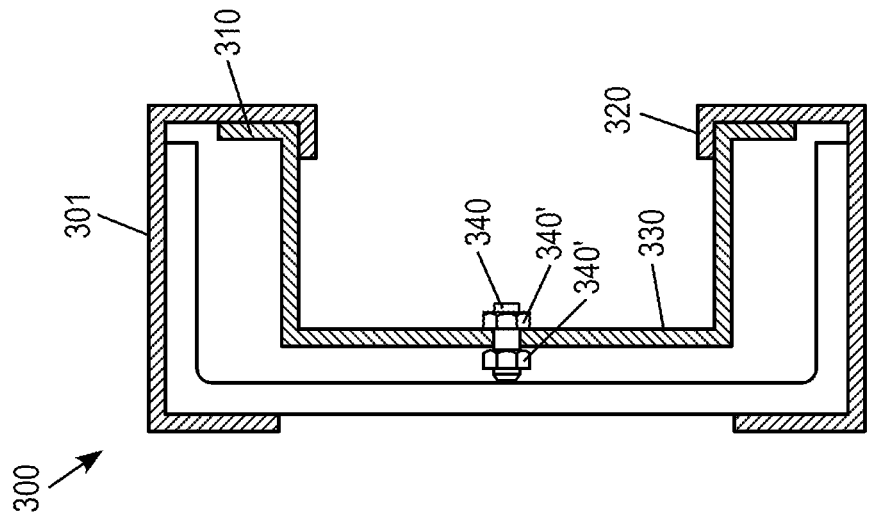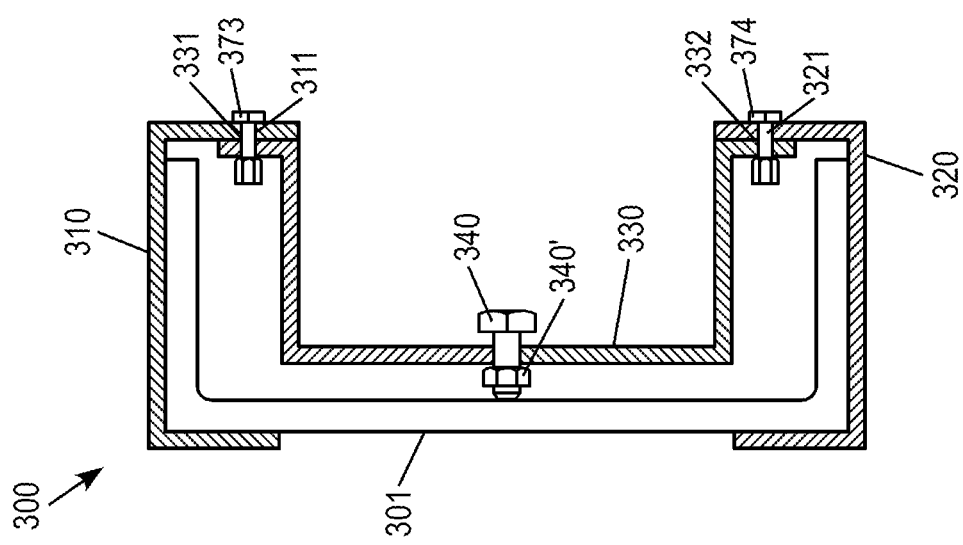

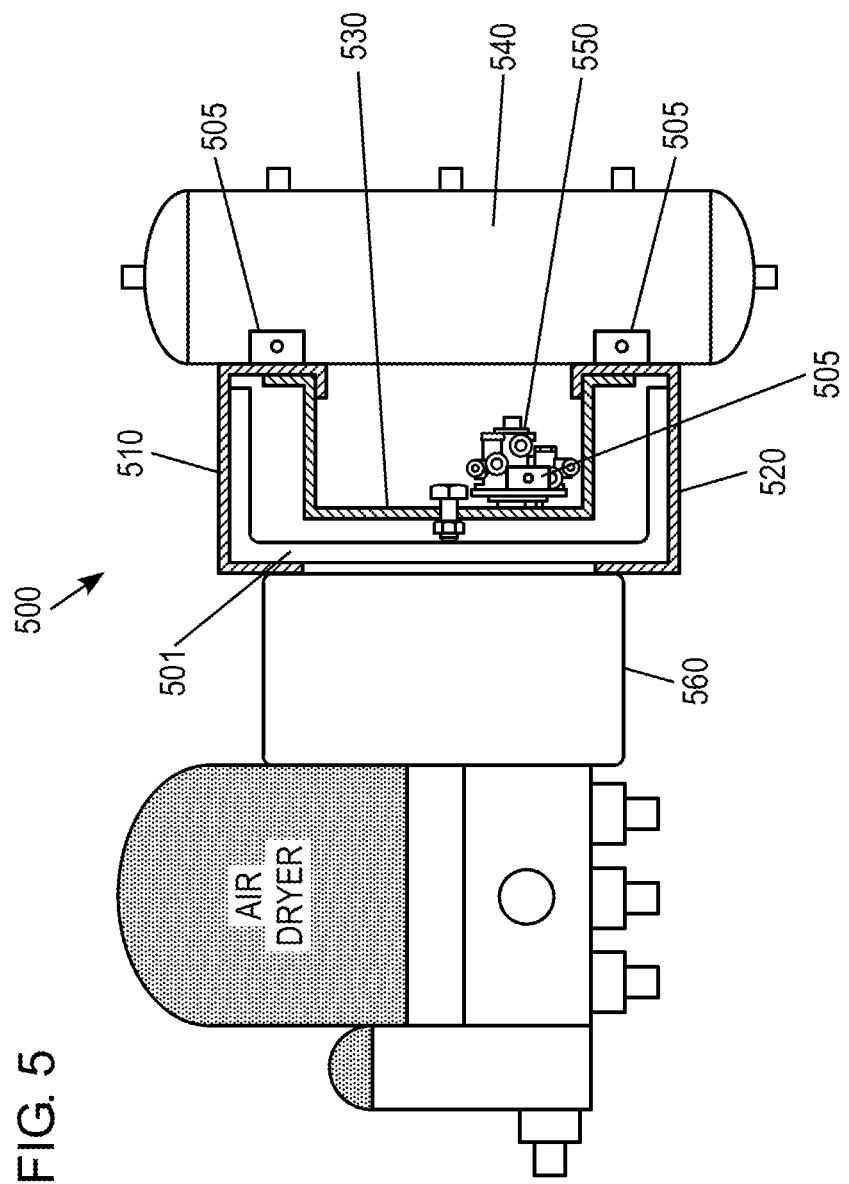

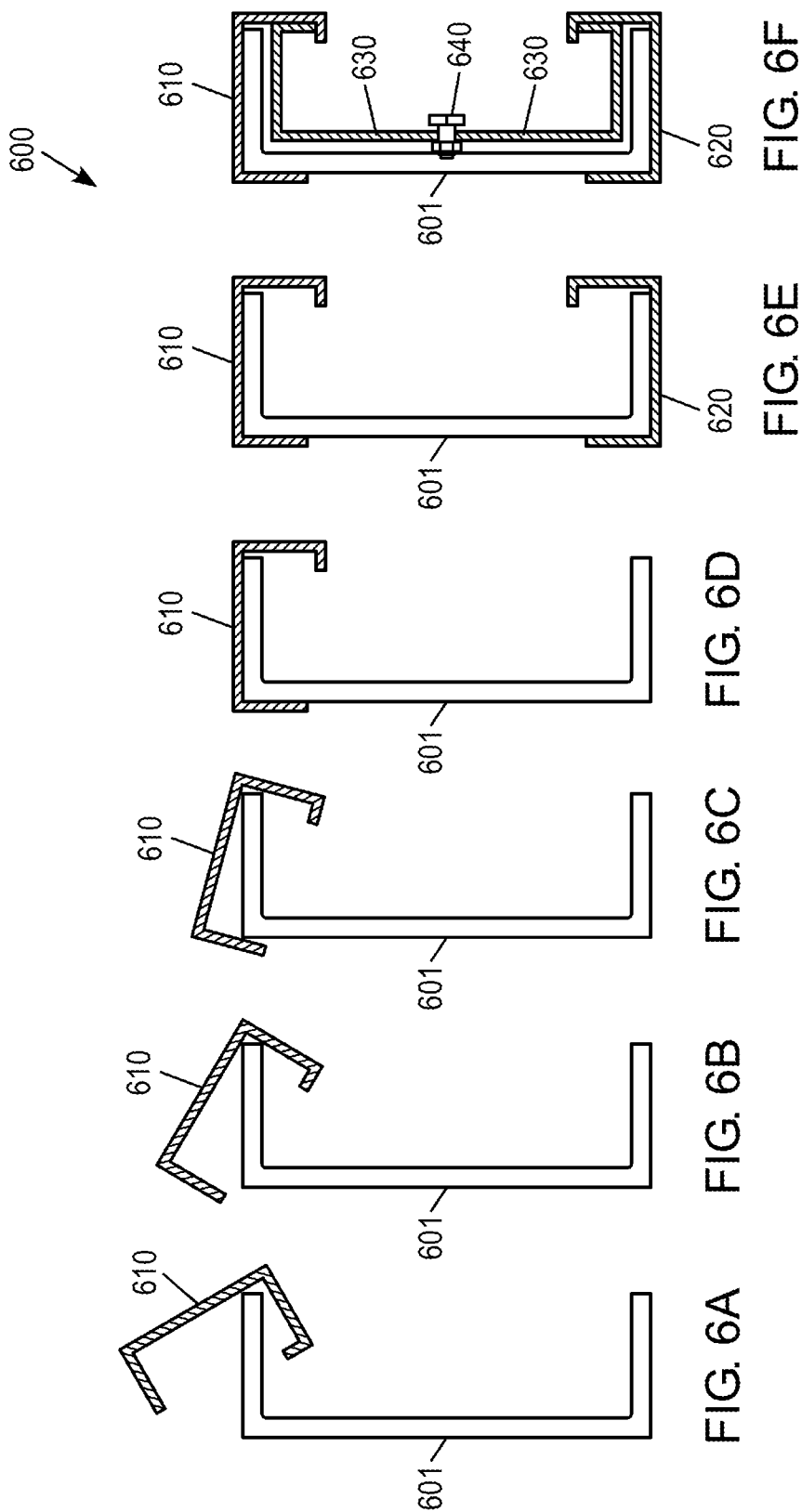

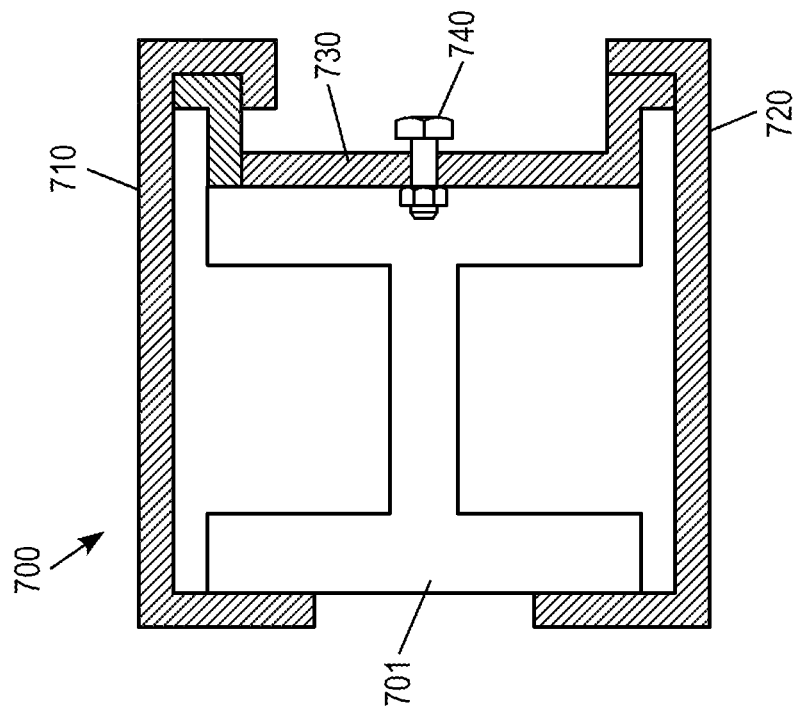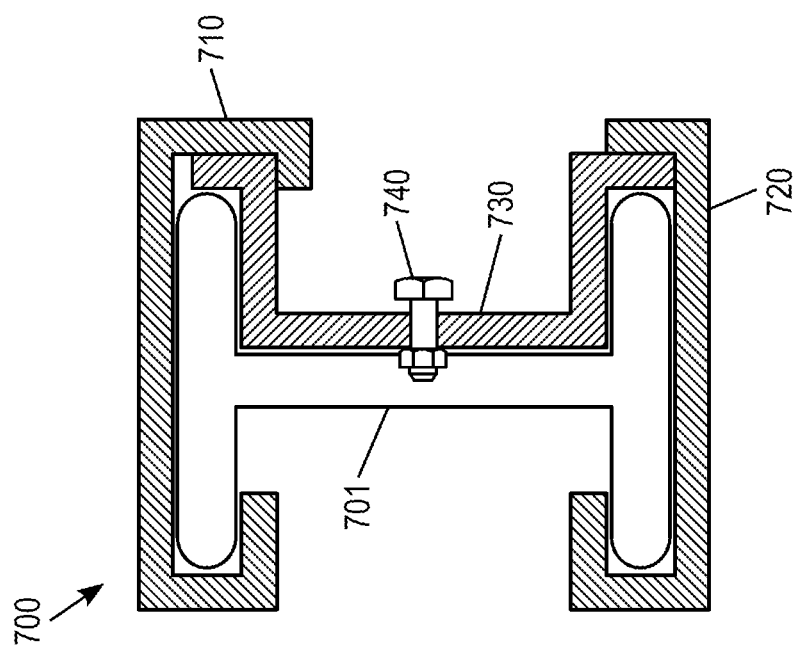

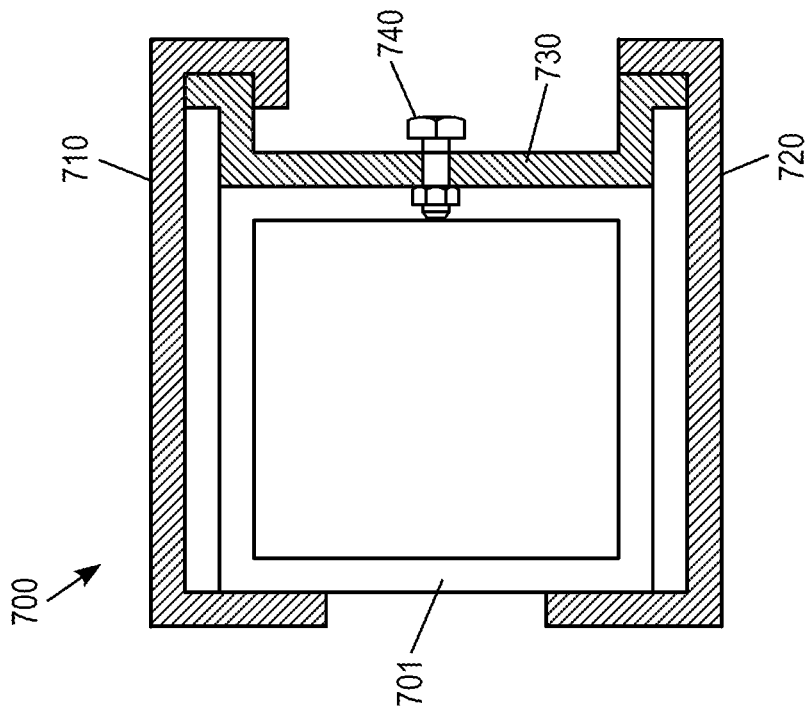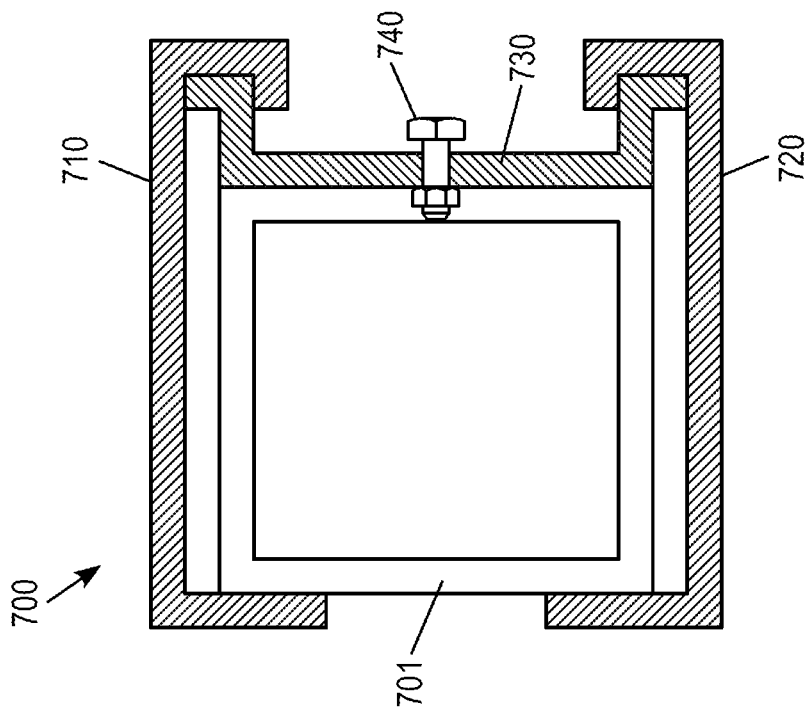

HEAVY-DUTY VEHICLE FRAME RAIL CLAMP ON MOUNTING BRACKET, AND METHOD OF INSTALLING THE SAME

FIELD

The field of endeavor of the present disclosure is that of: clamp on mounting brackets for heavy duty vehicle frame rails. That is, the field of endeavor of the present disclosure is not just that of clamp on mounting brackets, but rather that of clamp on mounting brackets for use in large commercial vehicle (a.k.a., heavy-duty vehicles) frame rails.

BACKGROUND

Heavy-duty vehicles can be found virtually everywhere. In fact, these vehicles are a key player in a wide variety of critical industries including agriculture, transportation, construction, and commerce, just to name a few. One common characteristic of these vehicles is that, due to their large load-carrying capacity, they are outfitted with large frame rails. These large frame rails or chassis provide heavy-duty vehicles with the strength and structural integrity needed to safely, reliably, and continuously carry heavy loads.

SUMMARY

The inventor of this disclosure has noted that due to their large load-carrying capacity, post manufacturing modifications to these large frame rails/chassis such as hole drilling, or welding are not only highly undesirable, as they may compromise the integrity of the frame rail, but in some cases such modifications may even violate regulations that govern the operation of these vehicles. This greatly limits the available options for attaching components to heavy duty vehicle frame rails, since two of the most commonly used means for attachment (i.e., drilling and welding) are not viable options.

In light of the above, this disclosure is reasonably pertinent to the problem of: weakening of heavy-duty frame rails. This problem occurs when heavy-duty frame rails are drilled or welded to install clamp on mounting brackets.

The above-referenced problem is solved by the inventive heavy-duty vehicle frame rail clamp on mounting bracket disclosed in this specification. In particular, the above-referenced problem is solved by a heavy-duty vehicle frame rail clamp on mounting bracket, which includes a first member, a second member, a third member, and at least one fastener. The third member is configured to contact the first member and the second member. The at least one fastener is applied to the third member. Upon a fastening thereof, the at least one fastener is configured to generate a clamping force on the first member, and on the second member. The first member and the second member may have a same shape.

With the foregoing configuration, the inventive heavy-duty vehicle frame rail clamp on mounting bracket solves the problem weakening of heavy-duty frame rails because the inventive heavy-duty vehicle frame rail clamp on mounting bracket does not require any drilling and/or welding. The inventive heavy-duty vehicle frame rail clamp on mounting bracket, however, does not only provide a solution to the above-referenced problem, but in addition the inventive heavy-duty vehicle frame rail clamp on mounting bracket exhibits a number of unexpected, and substantially improved results over existing heavy-duty vehicle frame rail clamp on mounting brackets.

For example, the inventive heavy-duty vehicle frame rail clamp on mounting bracket requires a small number of components. That is, the inventive heavy-duty vehicle frame rail clamp on mounting bracket requires a mere four individual components. Consequently, the inventive heavy-duty vehicle frame rail clamp on mounting bracket is easy to install, requiring few tools, and little time and effort for installation thereof.

The inventive heavy-duty vehicle frame rail clamp on mounting bracket also requires little maintenance and is safe to use. In fact, the inventive heavy-duty vehicle frame rail clamp on mounting bracket operates by clamping on different surfaces of the c-channel heavy-duty vehicle frame rail. This is a significant development because "grabbing" the c-channel requires the use of a bushing, which is interposed between the c-channel and the heavy-duty vehicle frame rail clamp on mounting bracket. With time, such bushing wears out, which may lead not only to rattling, but in a worst-case scenario to disengagement, which depending on the use of the clamp on bracket could have catastrophic consequences. The inventive heavy-duty vehicle frame rail clamp on mounting bracket, on the other hand, does not require such bushings.

Further, due to its design, the inventive heavy-duty vehicle frame rail clamp on mounting bracket may be used even in situations where an otherwise optimal installation location on the heavy-duty frame rail is already very crowded. That is, there may exist areas in heavy-duty frame rails which may be optimal for an installation standpoint, but such areas may already have other structures that have been installed by the manufacturer, or even post-manufacturing. Unlike existing devices, however, the inventive heavy-duty vehicle frame rail clamp on mounting bracket may be installed in such crowded areas. This is because, as will be discussed in detail below, due to its structure the inventive heavy-duty vehicle frame rail clamp on mounting bracket requires few contact points with the heavy-duty frame rail upon which it is installed. Further, the inventive heavy-duty vehicle frame rail clamp on mounting bracket can achieve clamping while avoiding structure that has been pre-installed on the heavy-duty vehicle frame rail.

The inventive heavy-duty vehicle frame rail clamp on mounting bracket exhibits great versatility. In fact, due to its geometry, which is fully complementary with the geometry of various profiles of heavy-duty vehicle frame rails, the inventive heavy-duty vehicle frame rail clamp on mounting bracket may be used across a wide array of existing heavy-duty vehicle frame rail profiles. These may include, but are certainly not limited to c-shape, i-shape, h-shape, square-shape, and rectangular-shape heavy-duty vehicle frame rail profiles, among others.

The inventive heavy-duty vehicle frame rail clamp on mounting bracket exhibits reduces production costs. In fact, due to its geometry, the inventive heavy-duty vehicle frame rail clamp on mounting bracket is easier to manufacture, as it requires less machining and less time to manufacture than other more geometrically complex heavy-duty vehicle frame rail clamp on mounting brackets. These manufacturing advantages yield manufacturing cost savings vis-à-vis heavy-duty vehicle frame rail clamp on mounting brackets having more complex geometries.

In light of the above, the inventive heavy-duty vehicle frame rail clamp on mounting bracket is better, safer, easier to install, and requires less maintenance than existing heavy-duty vehicle frame rail clamp on mounting brackets. In addition, the inventive heavy-duty vehicle frame rail clamp on mounting bracket is capable of being installed in locations where existing heavy-duty vehicle frame rail clamp on mounting brackets cannot be installed, such as in crowded areas where existing structure gets in the way of installation. Moreover, the inventive heavy-duty vehicle frame rail clamp on mounting bracket is easier and less expensive to manufacture.

Other objects, advantages and novel features of this disclosure will become apparent from the following detailed description of embodiments, when considered in conjunction with the accompanying drawings, in which:

BRIEF DESCRIPTION OF THE DRAWINGS

FIGS. 1A-1C are side views of an inventive heavy-duty vehicle frame rail clamp on mounting bracket;

FIGS. 2A and 2B are additional side views of the inventive heavy-duty vehicle frame rail clamp on mounting bracket;

FIGS. 3A and 3B are additional side views of the inventive heavy-duty vehicle frame rail clamp on mounting bracket;

FIG. 5 is another side view of an installation location of the inventive heavy-duty vehicle frame rail clamp on mounting bracket;

FIGS. 6A-6F are side views depicting a method for installing the inventive heavy-duty vehicle frame rail clamp on mounting bracket; and FIGS. 7A-7D are side views depicting the inventive heavy-duty vehicle frame rail clamp on mounting bracket installed on different heavy-duty vehicle frame rail profiles.

DETAILED DESCRIPTION

Figure 4:
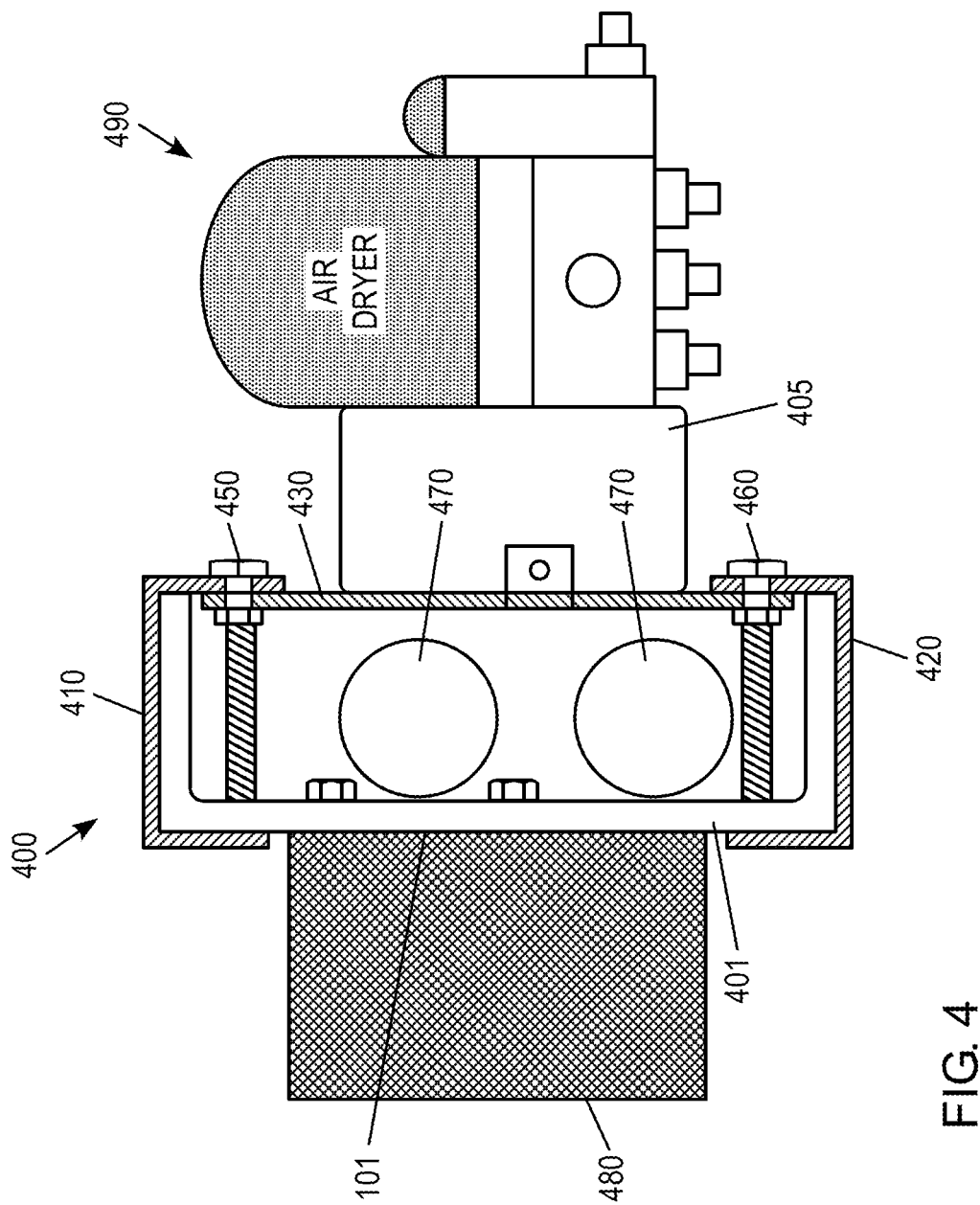
FIG. 4 is a side view of an installation location of the inventive heavy-duty vehicle frame rail clamp on mounting bracket.

FIG. 1A depicts an inventive heavy-duty vehicle frame rail clamp on mounting bracket 100. The inventive heavy-duty vehicle frame rail clamp on mounting bracket 100 includes only four independent components a first member 110, a second member 120, a third member 130, and at least one fastener 140. As shown in FIG. 1A, the third member 130 is configured to contact both the first member 110 and the second member 120. That is, as shown in FIG. 1A, the first member 110 contacts the third member 130 at the top portion of FIG. 1A (e.g., near 131). Additionally, the second member 120 also contacts the third member 130 at the bottom portion of FIG. 1A (e.g., near 132).

Notably, as can be seen in FIGS. 1A and 1B, the first member 110 and the second member 120 have the same shape. In fact, the first member 110 and the second member 120 may equal not only in general shape, but also in actual dimensions. Moreover, the first member 110 and the second member 120 may also be equal in material and structural composition.

The inventive heavy-duty vehicle frame rail clamp on mounting bracket 100 also includes at least one fastener 140. In fact, as shown in FIG. 1A, the at least one fastener is applied to the third member 130. In the illustrative, non-limiting example of FIG. 1A the inventive heavy-duty vehicle frame rail clamp on mounting bracket 100 is mounted on a heavy-duty vehicle frame rail 101 having a c-channel configuration. In such configuration, upon a fastening thereof the at least one fastener 140 is configured to generate multiple clamping forces. These clamping forces are illustrated in detail in FIG. 1B.

As shown in FIG. 1B, upon a fastening thereof, the at least one fastener 140 comes into contact with the heavy-duty vehicle frame rail 101, thereafter further fastening causes the nut 140' to push the third member 130 away from the heavy-duty vehicle frame rail 101 (i.e., toward the right of the figure). This motion generates not only force F3 exerted by the at least one fastener 140, but also generates a clamping force F1 on the first member 110, which results from clamping of the third member 130 onto the first member 110. Additionally, a clamping force F2 is also exerted onto the second member 102, which results from clamping of the third member 130 onto the second member 102.

As shown in FIGS. 1A and 1B, in the inventive heavy-duty vehicle frame rail clamp on mounting bracket 100 a shape of the third member 130 may differ from the shape of the first member 110 and from the shape of the second member 120. That is, while the general shape of the first member 110 and of the second member 120 may be the same, the general shape of the third member 130 may be different than that of the first member 110 and second member 120. This difference, however, need not be limited to shape or general shape. In fact, the third member 130 may differ from the first member 110 and second member 120 also in terms of dimension, material composition, and structural composition. The inventive heavy-duty vehicle frame rail clamp on mounting bracket 100, however, need not be limited to such configuration. For instance, while in some embodiments the third member 130 may differ from the first member 110 and second member 120 in terms of general shape, the third member 130 may be identical to the first member 110 and second member 120 in terms of material and structural composition.

As can be seen in FIG. 1A, the third member 130 may define therein an opening 135. Although this opening 135 may be depicted near the middle region of the third member 130, the inventive heavy-duty vehicle frame rail clamp on mounting bracket 100 need not be limited to such configuration. In fact, in other embodiments the opening 135 may be positioned anywhere along the third member 130 that may occur to those of ordinary skill in the art. Further, although the embodiments of FIGS. 1A and 1B depict a single opening 135, the inventive heavy-duty vehicle frame rail clamp on mounting bracket 100 need not be limited in such configuration. In fact, in other embodiments the inventive heavy-duty vehicle frame rail clamp on mounting bracket 100 may include 2 or even more openings 135, as may occur to those of ordinary skill in the art.

Irrespective of number of openings 135, in the inventive heavy-duty vehicle frame rail clamp on mounting bracket 100 the at least one fastener 140 spans through the opening 135 to make contact with the heavy-duty frame rail 101. Needless to say, in other embodiments, in which the third member 130 includes 2 or even more openings 135, the inventive heavy-duty vehicle frame rail clamp on mounting bracket 100 includes an equal number of fasteners 140, each of which will spans through its own opening 135, to thereby make contact with the heavy-duty frame rail 101. The number of openings 135 and fasteners 140 applied to the third member 130 may be any number that may occur to those of ordinary skill in the art, and in a practical sense will be only limited by the length of the third member 130 which defines the openings 135.

In some embodiments, the inventive heavy-duty vehicle frame rail clamp on mounting bracket 100 may include openings 135 which are not threaded. The inventive heavy-duty vehicle frame rail clamp on mounting bracket 100, however, need not be limited to such configuration. In fact, in other embodiments the openings 135 may be threaded. Further, the at least one fastener 140 may be a jack screw. The inventive heavy-duty vehicle frame rail clamp on mounting bracket 100, however, need not be limited to such configuration. In fact, in other embodiments the at least one fastener 140 may be a jam screw, a set screw, or any other type of fastener that may occur to those having ordinary skill in the art.

Additionally, as shown in FIGS. 1B and 1C, the at least one fastener 140 may include a nut 140' that is coupled to the at least one fastener 140. In some embodiments, the nut 140' may be a jam nut. The inventive heavy-duty vehicle frame rail clamp on mounting bracket 100, however, need not be limited to such configuration. In fact, as shown in FIG. 3A, in other embodiments the nut 140' may be a weld nut, or any other nut as may occur to those of ordinary skill in the art, as long as upon a fastening action of the at least one fastener 140, the nut 140' permits continuous passage of the at least one fastener 140 therethrough (e.g., toward the heavy-duty vehicle frame rail 101), while the more the at least one fastener 140 is fastened, the larger a force the nut 140' exerts on the third member 130 away from the heavy-duty vehicle frame rail 101.

Alternatively, as shown in FIG. 3B, the at least one fastener 340 may be a set screw, and in such an embodiment the set screw may include two nuts 340'. For instance, in one embodiment, one nut 340' may be disposed at a location that is closest to the heavy-duty vehicle frame rail 301. Further, such nut 340' may be a weld nut. In addition, the inventive heavy-duty vehicle frame rail clamp on mounting bracket 300 may also include a second nut 340' that may be disposed on the opposite side of the third member 330, relative to the first nut 340'. Further, this second nut 340' may be a jam nut.

As shown at least in FIGS. 1A-AC, in the inventive heavy-duty vehicle frame rail clamp on mounting bracket 100, a first axial end of the third member 130 may define a first flanged portion 131, while a second axial end of the third member 130 may define a second flanged portion 132. Further, as can be seen in FIG. 1A, the first flanged portion 131 and second flanged portion 132 may extend away from a center of the third member 130. That is, the first flanged portion 131 and second flanged portion 132 may extend toward the top and bottom of FIG. 1A, respectively, or away form a location of the at least one fastener 140 that is depicted in that Figure. The inventive heavy-duty vehicle frame rail clamp on mounting bracket 100, however, need not be limited to such configuration. In fact, in other embodiments such as the one depicted in FIG. 1C, the first flanged portion 131 and the second flanged portion 132 may extend toward a center of the third member 130.

As shown in FIG. 4, however, the inventive heavy-duty vehicle frame rail clamp on mounting bracket 400 need not be limited to such configuration, given that in other embodiments the third member 430 may be completely devoid of any flanged portion. In fact, as seen in FIG. 4, the third member 430 may be flat. Further, in such an embodiment the third member 430 may be coupled to the first member 410 and to the second member 420 via two fasteners 450 and 460. As shown in FIG. 4, these fasteners 450 and 460 may be applied at opposite axial ends of the third member 430.

As shown, for example, in FIGS. 1A-1C and 2B, in the inventive heavy-duty vehicle frame rail clamp on mounting bracket 100, the first member 110 may contact two different surfaces of the third member 130. Additionally, the second member 120 may also contact two different surfaces of the third member 130. The inventive heavy-duty vehicle frame rail clamp on mounting bracket 100, however, need not be limited to such configuration. In fact, in other embodiments such as, for example, that shown in FIGS. 2A and 3A the first member 110, 310 may contact only one surface of the third member 130, 330. Additionally, the second member 120, 320 may also contact only one surface of the third member 130, 330. The inventive heavy-duty vehicle frame rail clamp on mounting bracket 100, however, need not be limited to configurations in which the first member 110 and the second member 120 have an equal number contacts with the third member 130. Thus, in other embodiments the first member 110 may contact only one surface of the third member 130, while the second member 120 may contact two different surfaces of the third member 130, or vice versa.

As shown in FIG. 1C, in the inventive heavy-duty vehicle frame rail clamp on mounting bracket 100, only one axial end of the first member 110 (e.g., which contacts the first flanged portion 131) and only one axial end of the second member 120 (e.g., which contacts the first flanged portion 132) may define a flanged portion. The inventive heavy-duty vehicle frame rail clamp on mounting bracket 100, however, need not be limited to such configuration. In fact, in other embodiments such as, for example, that shown in FIG. 3A the first member 310 and the second member 320 may be devoid of any flanged portion. Alternatively, though not depicted, only one of the first member 310 or second member 320 may have a flanged portion.

As shown in FIGS. 1A-1C, in the inventive heavy-duty vehicle frame rail clamp on mounting bracket 100, the flanged portion of the first member 110 and the flanged portion of the second member 120 may extend toward the opposite axial end of the first member 110 and the opposite axial end of the second member 120, respectively. That is, as shown in FIG. 1A-1C the flanged portions of the first member 110 and second member 120 both extend toward the end of the first member 110 and second member 120 that clamp against the heavy-duty vehicle frame rail 101.

As shown in FIGS. 1A-1C, in the inventive heavy-duty vehicle frame rail clamp on mounting bracket 100, the interaction between the flanged portions on the third member 130 with respective flange portions in the first member 110 and second member 120 allows for the application and distribution of clamping forces to the first 110, second 120, and third member 130, without allowing these components to move relative to one another. The inventive heavy-duty vehicle frame rail clamp on mounting bracket 100, however, need not be limited to such configuration. In fact, as shown in FIG. 2B, the third member 230 may be coupled to the first member 210 and to the second member 220 via multiple fasteners 250 and 260.

Further, as shown in FIG. 3A, the first flanged portion may define a first opening 331, and the second flanged portion may define a second opening 332. Additionally, the first member 310 may itself define a first opening 311, and the second member 320 may also itself define a second opening 321. With such openings, the inventive heavy-duty vehicle frame rail clamp on mounting bracket 100, may also include a second fastener 373 that spans through the first openings in the first flanged portion 331 and the first member 311, and a third fastener 374 that spans through the second opening of the second flanged portion 332 and the second member 321.

With the foregoing configuration, the inventive heavy-duty vehicle frame rail clamp on mounting bracket 100, may be provide a mechanical fastening between the first member 310 and the third member 330, and between second member 320 and the third member 330. The inventive heavy-duty vehicle frame rail clamp on mounting bracket 100, however, need not be limited to such configuration. In fact, in other embodiments, only one of the first member 310 or second member 320 may be fastened to the third member 330. Further, in some refinements, the inventive heavy-duty vehicle frame rail clamp on mounting bracket 100 may be both flanged and fastened. For example, in some embodiments the inventive heavy-duty vehicle frame rail clamp on mounting bracket 200 may be flanged at both the third member 230 and first member 210 and second member 220, as shown in FIG. 2B, while at the same time the flanged connection may be fastened with fasteners 250 and 260. Such flanged and fastened configurations could be particularly suitable for applications in which the inventive heavy-duty vehicle frame rail clamp on mounting bracket 200 will be subjected to very heavy loads.

As shown in FIG. 2A, in the inventive heavy-duty vehicle frame rail clamp on mounting bracket 200, at least one of the first member 210, the second member 220, and the third member 230 have a anchoring portion 205 to which at least one accessory is attachable. That is, although in FIG. 2A the anchoring portion 205 is depicted as being formed only on first member 210, the anchoring portion 205 may be formed on any of the first member 210, second member 220, or third member 230. Further, in alternate embodiments all of these members may have a anchoring portion 205 at the same time, thereby allowing for multiple accessories.

As shown in FIG. 4, the anchoring portion 405 may be alternatively formed on the third member 430, where it is used to attach an air dryer. The inventive heavy-duty vehicle frame rail clamp on mounting bracket 400, however, need not be limited to such configuration, given that the anchoring portion 405 may be used to attach any accessory that may occur to those of ordinary skill in the art. Further, the anchoring portion 405 may be an integral part of the first member 410, second member 420, or third member 430, so as to be formed in one piece therewith. Alternatively, the anchoring portion 405 may be attached to first member 410, second member 420, or third member 430 post manufacturing, via welding or via any other means that may occur to those having ordinary skill in the art. In fact, as shown in FIG. 5 the anchoring portion 505 may be provided on the first member 510 and second member 520, so as to thereby attach an air tank. In addition, the third member 530 may also be fitted with a anchoring portion 505 to which an air valve may be attached. The inventive heavy-duty vehicle frame rail clamp on mounting bracket 500, however, need not be limited to such configuration. In fact, virtually any accessory as may occur to those having ordinary skill in the art may be attached to anchoring portion 505, with the only limitation being that of space available for installation.

Additionally, in the inventive heavy-duty vehicle frame rail clamp on mounting bracket 100 may be configured in such a way that different regions of the first member 110, the second member 120, and the third member 130 have different characteristics. These different characteristics may include at least one of a material composition, and/or a material thickness, and/or a different magnetic property. In fact, each member 110, 120, and/or 130 may be composed of a different material as long as it withstands environmental and/or structural forces, and the materials may include, for example, steel, aluminum, other metals, and even some plastics. Further, different regions of the first member 110, second member 120, and third member 130 may have different thicknesses. By varying material composition or thickness, for example, the inventive heavy-duty vehicle frame rail clamp on mounting bracket 100 may exhibit improved strength. This is because areas of the first member 110, second member 120, and third member 130 which are prone to material failure, may be provided with a larger thickness or with a different material composition, to thereby improve load resistance. Alternatively, or in addition thereto, the magnetic property of the inventive heavy-duty vehicle frame rail clamp on mounting bracket 100 may be locally different to thereby facilitate assembly. For example, in one embodiment the surfaces of the first member 110, and/or the second member 120 which contact the heavy-duty vehicle frame rail 101 may be magnetized so that upon contact with the heavy-duty vehicle frame rail 101 the first member 110 and/or second member 120 may become lightly immobilized, to thereby facilitate installation. These same magnetic properties may be applied at meeting surfaces between the first member 110 and the third member 130, and/or at meeting surfaces between the second member 120 and the third member 130, for example. With this configuration, the inventive heavy-duty vehicle frame rail clamp on mounting bracket 100 greatly facilitates installation, and such features may be particularly useful in embodiments in which there are no fasteners at the ends of the first member 110 and second member 120.

As shown in FIG. 1B, in the inventive heavy-duty vehicle frame rail clamp on mounting bracket 100 upon a fastening thereof the at least one fastener 140 is configured to also generate additional clamping forces F1' and F2' on different points of a heavy-duty vehicle frame rail 101 via contact with the first member 110 and the second member 120, respectively. That is, as the at least one fastener 140 is fastened; via the nut 140' the inventive heavy-duty vehicle frame rail clamp on mounting bracket 100 pushes the third member 130 away from the heavy-duty vehicle frame rail 101. This motion results not only on clamping forces being generated between the third member 130 and the first and second member F1 and F2, respectively, but also results in the generation of clamping force F1' between the first member 110 and the heavy-duty vehicle frame rail 101, and clamping force F2' between the second member 120 and the heavy-duty vehicle frame rail 101. Notably, all of the forces F1, F2, F3, F1', and F2' are the direct result of a fastening action of a single fastening element 140. The inventive heavy-duty vehicle frame rail clamp on mounting bracket 100, however, need not be limited to such configuration. For example, in alternate embodiments, the inventive heavy-duty vehicle frame rail clamp on mounting bracket 100 may be provided with a total of two, three, or any number of fasteners 140 as may occur to those of ordinary skill in the art.

As depicted in FIG. 1B, the inventive heavy-duty vehicle frame rail clamp on mounting bracket 100 exerts clamping forces F1' and F2' on the heavy-duty vehicle frame rail 101 via contact of the first member 110 with the heavy-duty vehicle frame rail 101, and the second member 120 with the heavy-duty vehicle frame rail 101, respectively. Notably, these clamping forces result from a flat surface to flat surface interaction. That is, at a location of the clamping force F1' and at a location of clamping force F2' both the surface of the first and second member 110, 120, as well as the surfaces on the heavy-duty vehicle frame rail 101 these interact with are flat.

With the foregoing configuration, the inventive heavy-duty vehicle frame rail clamp on mounting bracket 100 does not require "grabbing" onto an edge of the heavy-duty vehicle frame rail 101 for operation. Thus, the inventive heavy-duty vehicle frame rail clamp on mounting bracket 100 does not require a bushing interposed between edges of the heavy-duty vehicle frame rail 101 and the first and second member 110, 120, given that in the inventive heavy-duty vehicle frame rail clamp on mounting bracket 100 the clamping forces arise from direct contact of flat surfaces between the first and second member 110, 120 and the heavy-duty vehicle frame rail 101.

The number of fasteners may vary. In fact, as shown in FIG. 4, in some embodiments there may be multiple fasteners 450 and 460, and these fasteners 450 and 460 may be disposed not near the center of the third member 430, but rather at opposite axial ends thereof. In this configuration, the fasteners 450 and 460 not only fasten the third member 430 to the first member 410 and to the second member 420, respectively, but they also generate clamping forces like those discussed above.

As shown in FIG. 4, in the inventive heavy-duty vehicle frame rail clamp on mounting bracket 400 the third member 430 is configured to overlap at least one non-movable component 470 of the heavy-duty vehicle frame rail 401 to thereby close an otherwise open profile of the heavy-duty vehicle frame rail 401. With this configuration, the inventive heavy-duty vehicle frame rail clamp on mounting bracket 400 not only allows for the installation thereof in an area that was previously very crowded, and as such not suitable for installation; but, in addition, in the inventive heavy-duty vehicle frame rail clamp on mounting bracket 400, via anchoring portion 405, an additional accessory 490 may be installed in that crowded area. It should be readily understood to those having ordinary skill in the art that even though the accessory depicted in FIG. 4 may be an air dryer, the inventive heavy-duty vehicle frame rail clamp on mounting bracket 400 need not be limited to such configuration. In fact, in other embodiments the accessory 490 may be any accessory that may occur to those having ordinary skill in the art.

As shown in FIG. 4, the non-movable components 470, 480, and 485 may be located on both sides of the heavy-duty vehicle frame rail 401. Due to its construction, however, the inventive heavy-duty vehicle frame rail clamp on mounting bracket 400 may still be installed in such areas. This results from the limited areas of contact that are needed between the first member 410 and second member 420 with the heavy-duty vehicle frame rail 401 for installation. Thus, as shown in FIG. 4, even when large non-movable components 470, 480 are pre-installed on the heavy-duty vehicle frame rail 401, the inventive heavy-duty vehicle frame rail clamp on mounting bracket 400 may still be deployed.

As shown in FIGS. 1A-1C, the inventive heavy-duty vehicle frame rail clamp on mounting bracket 100 may be attached to a heavy-duty vehicle frame rail 101 having a c-shape profile. The inventive heavy-duty vehicle frame rail clamp on mounting bracket 700, however, need not be limited to such configuration. In fact, as shown in FIGS. 7A-7D, the inventive heavy-duty vehicle frame rail clamp on mounting bracket 700 may be attached to many different heavy-duty vehicle frame rail 701 profiles. These profiles, may include, but are certainly not limited to, an i-shape profile (e.g., FIG. 7A), an h-shape profile (e.g., FIG. 7B), a square-shape profile (e.g., FIG. 7C), and a rectangular-shape profile (e.g., FIG. 7D). As can be seen in FIGS. 7A-7D, despite radical differences in shape profile, the inventive heavy-duty vehicle frame rail clamp on mounting bracket 700 maintains its general structure for each of the different heavy-duty vehicle frame rails 701 depicted. That is, despite being applied to different heavy-duty vehicle frame rail 701 profiles, the inventive heavy-duty vehicle frame rail clamp on mounting bracket 700 retains its four components, which include a first member 710, a second member 720, a third member 730, and at least one faster 740.

With reference to FIGS. 6A-6F, the present disclosure is also directed to a method for attaching an inventive heavy-duty frame rail clamp on mounting bracket 600 to a heavy-duty vehicle frame 601. In the inventive method, the first member 610 is disposed on a first side of the heavy-duty vehicle frame 601. Since the shape of the first member 610 and second member 620 are complementary to the shape of the heavy-duty vehicle frame 601 installation of the first member 610 is as straight forward as placing the first member 610 over the desired surface of the heavy-duty vehicle frame 601. This process is then essentially repeated for the second member 620. That is, the second member 620 is also disposed on a second side of the vehicle frame that is opposite to the first side.

The method also includes disposing a third member 630 between the first member 610 and the second member 620, so that the third member 630 makes contact with the first member 610 and with the second member 620. It should be noted, however, that the inventive method is not limited to the order previously discussed. That is, the method may also be carried out such that the third member 630 or the second member 620 may be applied first, so long as upon assembly thereof the third member 630 contacts both the first member 610 and the second member 620.

The method also includes inserting one fastener 640 through the third member 630, such that upon a fastening thereof the one fastener 640 is configured to generate a clamping force on the first member 610, and on the second member 620, and on multiple points on the vehicle frame 601. These multiple points were previously discussed with reference to FIG. 1B supra. As shown in FIG. 6F, the first member 610 and the second member 620 have a same shape, while the first member 610 and the second member 620 have a different shape than a shape of the third member 630. As shown in FIGS. 1B and 6F, in the inventive method all of the clamping forces F1, F2, F3, F1' and F2' arise from the fastening of only the one fastener 140, 640, as the fastening of only the one fastener 140, 640 pushes the third member 130, 630 away from the vehicle frame 101, 601.

With reference to FIG. 1B, the clamping forces F1, F2, F3, F1', and F2' on the multiple points of the vehicle frame 101 is effected via an interaction between planar surfaces located on the vehicle frame 101 and planar surfaces located on both the first member 110 and the second member 120. Moreover, with reference to FIG. 3A, the inventive method may also include fastening a first axial end of the third member 330 and the first member 110 with a second fastener 373, and fastening a second axial end of the third member 330 and the second member 320 with a third fastener 374.

With reference to FIG. 1A, the present disclosure also relates to a heavy-duty frame rail clamp on mounting bracket 100 for a vehicle frame 101, which includes a first means for clamping 110 a first side of the vehicle frame 101, a second means 120 for clamping a second side of the vehicle frame 101, which is opposite to the first side, and means for operatively coupling 130 the first means 110 to the second means 120. The inventive heavy-duty frame rail clamp on mounting bracket 100 may also include a single fastening means 140, which is applied to the means for operatively coupling 130 and which upon a fastening thereof is configured to generate a clamping force on the first means 110, and on the second means 120, and on multiple points of the vehicle frame 101. Moreover, in the inventive heavy-duty frame rail clamp on mounting bracket 100, the first means 110 and the second means 120 may have a same shape.

The foregoing disclosure has been set forth merely to illustrate the invention and is not intended to be limiting. Because these and other such modifications of the disclosed embodiments incorporating the spirit and substance of the invention may occur to persons of ordinary skill in the art, the invention should be construed to include everything within the scope of the appended claims and equivalents thereof.

The invention claimed is:

1. A heavy-duty vehicle frame rail clamp on mounting bracket, comprising:
    a first member;
    a second member;
    a third member that is configured to contact the first member and the second member; and
    at least one fastener that is applied to the third member, and which upon a fastening thereof is configured to generate a clamping force on: i) the first member, and ii) the second member, wherein
        the first member and the second member have the same shape at a point where the clamping force is exerted,
        a shape of the third member differs from: i) the shape of the first member, and ii) the shape of the second member, and
        a first axial end of the third member defines a first flanged portion, and a second axial end of the third member defines a second flanged portion.

2. The heavy-duty vehicle frame rail clamp on mounting bracket of claim 1, wherein the third member defines a biasing opening and the at least one fastener spans through the biasing opening, the biasing opening is threaded and the at least one fastener is a jack screw.

3. The heavy-duty vehicle frame rail clamp on mounting bracket of claim 1, wherein the first member contacts two different surfaces of the third member, and the second member contacts two different surfaces of the third member.

4. The heavy-duty vehicle frame rail clamp on mounting bracket of claim 1, wherein the first member contacts only one surface of the third member, and the second member contacts only one surface of the third member.

5. The heavy-duty vehicle frame rail clamp on mounting bracket of claim 1, wherein the first flanged portion defines a first opening, the second flanged portion defines a second opening, the first member defines a first opening, and the second member defines a second opening, wherein the heavy-duty vehicle frame rail clamp on mounting bracket further comprises:
    a second fastener that spans through the first opening of: i) the first flanged portion, and ii) the first member; and
    a third fastener that spans through the second opening of: i) the second flanged portion, and ii) the second member.

6. The heavy-duty vehicle frame rail clamp on mounting bracket of claim 1, wherein at least one of the first member, the second member, and the third member have an anchoring portion to which at least one accessory is attachable.

7. The heavy-duty vehicle frame rail clamp on mounting bracket of claim 1, wherein different regions of the first member, the second member, and the third member have different characteristics, and the different characteristics include at least one of a material composition, a material thickness, and a different magnetic property.

8. The heavy-duty vehicle frame rail clamp on mounting bracket of claim 1, wherein upon a fastening thereof the at least one fastener is configured to also generate additional clamping forces on different points of a heavy-duty vehicle frame rail via contact with the first member and the second member, respectively.

9. The heavy-duty vehicle frame rail clamp on mounting bracket of claim 8, wherein the third member is configured to overlap at least one non-movable component of the heavy-duty vehicle frame rail to thereby close an open profile of the heavy-duty vehicle frame rail.

10. The heavy-duty vehicle frame rail clamp on mounting bracket of claim 9, wherein the third member is flat and the at least one fastener includes two fasteners that are applied at opposite axial ends of the third member.

11. The heavy-duty vehicle frame rail clamp on mounting bracket of claim 9, wherein a profile of the heavy-duty vehicle frame rail is one of a c-shape, i-shape, h-shape, square-shape, and rectangular-shape.

12. A method for attaching a heavy-duty frame rail clamp on mounting bracket to a vehicle frame, comprising:
    disposing a first member on a first side of the vehicle frame;
    disposing a second member on second side of the vehicle frame that is opposite to the first side;
    disposing a third member between the first member and the second member, so that the third member makes contact with the first member and with the second member;
    inserting one fastener through the third member, such that upon a fastening thereof the one fastener is configured to generate a clamping force on: i) the first member, ii) the second member, and) iii) multiple points of the vehicle frame, wherein
        the first member and the second member have the same shape.

13. The method of claim 12, wherein the first member and the second member have a different shape than a shape of the third member.

14. The method of claim 13, wherein all of the clamping forces arise from a fastening of only the one fastener.

15. The method of claim 14, wherein the fastening of only the one fastener pushes the third member away from the vehicle frame.

16. The method of claim 12, wherein the clamping force on the multiple points of the vehicle frame is effected via an interaction between planar surfaces located on the vehicle frame and planar surfaces located on both the first member and the second member.

17. The method of claim 12, further comprising
    fastening a first axial end of the third member and the first member with a second fastener; and
    fastening a second axial end of the third member and the second member with a third fastener.

18. A heavy-duty frame rail clamp on mounting bracket for a vehicle frame, comprising:
    first means for clamping a first side of the vehicle frame;
    second means for clamping a second side of the vehicle frame, which is opposite to the first side;
    means for operatively coupling the first means to the second means;
    a single fastening means, which is applied to the means for operatively coupling and which upon a fastening thereof is configured to generate a clamping force on: i) the first means, ii) the second means, and iii) multiple points of the vehicle frame, wherein the first means and the second means have the same shape.

* * * * *